(12) United States Patent
Hashimoto

(10) Patent No.: US 7,760,959 B2
(45) Date of Patent: Jul. 20, 2010

(54) IMAGING APPARATUS AND IMAGING SYSTEM

(75) Inventor: Seiji Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 11/555,438

(22) Filed: Nov. 1, 2006

(65) Prior Publication Data

US 2007/0120985 A1 May 31, 2007

(30) Foreign Application Priority Data

Nov. 4, 2005 (JP) .............................. 2005-321398

(51) Int. Cl.
  *G06K 9/40* (2006.01)
  *G06K 9/00* (2006.01)
  *H04N 5/228* (2006.01)
  *H04N 5/335* (2006.01)

(52) U.S. Cl. .................... 382/254; 382/162; 348/222.1; 348/273

(58) Field of Classification Search ................. 382/254, 382/260, 298, 299, 300, 162, 167; 348/222.1, 348/272, 273, 279, 280, 294; 358/514
See application file for complete search history.

(56) References Cited

U.S. PATENT DOCUMENTS

| | | | |
|---|---|---|---|
| 4,914,319 A * | 4/1990 | Hashimoto | 327/94 |
| 5,955,753 A | 9/1999 | Takahashi | |
| 6,124,888 A | 9/2000 | Terada et al. | |
| 6,765,616 B1 * | 7/2004 | Nakano et al. | 348/322 |
| 6,992,714 B1 | 1/2006 | Hashimoto et al. | |
| 2002/0041332 A1 * | 4/2002 | Murata et al. | 348/272 |
| 2002/0057354 A1 * | 5/2002 | Yanai et al. | 348/273 |
| 2003/0169354 A1 * | 9/2003 | Aotsuka | 348/272 |
| 2005/0052552 A1 | 3/2005 | Hashimoto | |

FOREIGN PATENT DOCUMENTS

| | | |
|---|---|---|
| JP | 09-046596 | 2/1997 |
| JP | 09-247689 | 9/1997 |
| JP | 2001-036920 | 2/2001 |
| JP | 2002135793 | 5/2002 |

* cited by examiner

*Primary Examiner*—Yon Couso
(74) *Attorney, Agent, or Firm*—Fitzpatrick, Cella, Harper & Scinto

(57) ABSTRACT

An imaging apparatus includes a pixel unit having a plurality of components, each having a plurality of pixels arranged in row and column directions. The plurality of pixels in each component output color signals having a plurality of colors. The apparatus also includes an adding unit configured to perform an addition of color signals of the same color in each component. The color signals are outputted from the plurality of pixels. The adding unit performs the addition without adding a color signal outputted from a part of the plurality of pixels in each component such that spatial centroids of the added color signals having a plurality of colors are located at substantially the same pitch at least in one of the row and column directions.

8 Claims, 14 Drawing Sheets

FIG. 1

| | 1st COLUMN | 2nd COLUMN | 3rd COLUMN | 4th COLUMN | 5th COLUMN | 6th COLUMN | ... | nth COLUMN |
|---|---|---|---|---|---|---|---|---|
| 1st ROW | R1, 1 | G1, 2 | R1, 3 | G1, 4 | R1, 5 | G1, 6 | | |
| 2nd ROW | G2, 1 | B2, 2 | G2, 3 | B2, 4 | G2, 5 | B2, 6 | | |
| 3rd ROW | R3, 1 | G3, 2 | R3, 3 | G3, 4 | R3, 5 | G3, 6 | | |
| 4th ROW | G4, 1 | B4, 2 | G4, 3 | B4, 4 | G4, 5 | B4, 6 | | |
| 5th ROW | R5, 1 | G5, 2 | R5, 3 | G5, 4 | R5, 5 | G5, 6 | | |
| 6th ROW | G6, 1 | B6, 2 | G6, 3 | B6, 4 | G6, 5 | B6, 6 | | |
| ... | | | | | | | | |
| mth ROW | | | | | | | | |

FIG. 3A

|  | 1st COLUMN | 2nd COLUMN | 3rd COLUMN | 4th COLUMN | 5th COLUMN | 6th COLUMN | ... | nth COLUMN |
|---|---|---|---|---|---|---|---|---|
| 1st ROW | R1,1 |  | R1,3 | G1,4 |  | G1,6 |  |  |
| 2nd ROW |  |  |  |  |  |  |  |  |
| 3rd ROW | R3,1 |  | R3,3 | G3,4 |  | G3,6 |  |  |
| 4th ROW | G4,1 |  | G4,3 | B4,4 |  | B4,6 |  |  |
| 5th ROW |  |  |  |  |  |  |  |  |
| 6th ROW | G6,1 |  | G6,3 | B6,4 |  | B6,6 |  |  |
| ... |  |  |  |  |  |  |  |  |
| mth ROW |  |  |  |  |  |  |  |  |

FIG. 3B

|  | 1st COLUMN | 2nd COLUMN | 3rd COLUMN | 4th COLUMN | 5th COLUMN | 6th COLUMN | ... | nth COLUMN |
|---|---|---|---|---|---|---|---|---|
| 1st ROW |  |  |  |  |  |  |  |  |
| 2nd ROW |  | r1,1 |  |  | g1,2 |  |  |  |
| 3rd ROW |  |  |  |  |  |  |  |  |
| 4th ROW |  |  |  |  |  |  |  |  |
| 5th ROW |  | g2,1 |  |  | b2,2 |  |  |  |
| 6th ROW |  |  |  |  |  |  |  |  |
| ... |  |  |  |  |  |  |  |  |
| mth ROW |  |  |  |  |  |  |  |  | r1,1 = R1,1 + R1,3 + R3,1 + R3,3 g1,2 = G1,4 + G1,6 + G3,4 + G3,6 g2,1 = G4,1 + G4,3 + G6,1 + G6,3 b2,1 = B4,4 + B4,6 + B6,4 + B6,6

FIG. 4A

|  | 1st COLUMN | 2nd COLUMN | 3rd COLUMN | 4th COLUMN | 5th COLUMN | 6th COLUMN | 7th COLUMN | 8th COLUMN | 9th COLUMN | 10th COLUMN | ... | nth COLUMN |
|---|---|---|---|---|---|---|---|---|---|---|---|---|
| 1st ROW | R1,1 |  | R1,3 |  | R1,5 | G1,6 |  | G1,8 |  | G1,10 |  |  |
| 2nd ROW |  |  |  |  |  |  |  |  |  |  |  |  |
| 3rd ROW | R3,1 |  | R3,3 |  | R3,5 | G3,6 |  | G3,8 |  | G3,10 |  |  |
| 4th ROW |  |  |  |  |  |  |  |  |  |  |  |  |
| 5th ROW | R5,1 |  | R5,3 |  | R5,5 | G5,6 |  | G5,8 |  | G5,10 |  |  |
| 6th ROW | G6,1 |  | G6,3 |  | G6,5 | B6,6 |  | B6,8 |  | B6,10 |  |  |
| 7th ROW |  |  |  |  |  |  |  |  |  |  |  |  |
| 8th ROW | G8,1 |  | G8,3 |  | G8,5 | B8,6 |  | B8,8 |  | B8,10 |  |  |
| 9th ROW |  |  |  |  |  |  |  |  |  |  |  |  |
| 10th ROW | G10,1 |  | G10,3 |  | G10,5 | B10,6 |  | B10,8 |  | B10,10 |  |  |
| ... |  |  |  |  |  |  |  |  |  |  |  |  |
| mth ROW |  |  |  |  |  |  |  |  |  |  |  |  |

FIG. 4B

|  | 1st COLUMN | 2nd COLUMN | 3rd COLUMN | 4th COLUMN | 5th COLUMN | 6th COLUMN | 7th COLUMN | 8th COLUMN | 9th COLUMN | 10th COLUMN | ... | nth COLUMN |
|---|---|---|---|---|---|---|---|---|---|---|---|---|
| 1st ROW |  |  |  |  |  |  |  |  |  |  |  |  |
| 2nd ROW |  |  |  |  |  |  |  |  |  |  |  |  |
| 3rd ROW |  |  | r1,1 |  |  |  |  |  | g1,2 |  |  |  |
| 4th ROW |  |  |  |  |  |  |  |  |  |  |  |  |
| 5th ROW |  |  |  |  |  |  |  |  |  |  |  |  |
| 6th ROW |  |  |  |  |  |  |  |  |  |  |  |  |
| 7th ROW |  |  |  |  |  |  |  |  |  |  |  |  |
| 8th ROW |  |  | g2,1 |  |  |  |  |  | b2,2 |  |  |  |
| 9th ROW |  |  |  |  |  |  |  |  |  |  |  |  |
| 10th ROW |  |  |  |  |  |  |  |  |  |  |  |  |
| ... |  |  |  |  |  |  |  |  |  |  |  |  |
| mth ROW |  |  |  |  |  |  |  |  |  |  |  |  | r1,1 = R1,1+R1,3+R1,5
+R3,1+R3,3+R3,5
+R5,1+R5,3+R5,5 g1,2 = G1,6+G1,8+G1,10
+G3,6+G3,8+G3,10
+G5,6+G5,8+G5,10 g2,1 = G6,1+G6,3+G6,5
+G8,1+G8,3+G8,5
+G10,1+G10,3+G10,5 b2,1 = B6,6+B6,8+B6,10
+B8,6+B8,8+B8,10
+B10,6+B10,8+B10,10

FIG. 5A

| | 1st COLUMN | 2nd COLUMN | 3rd COLUMN | 4th COLUMN | 5th COLUMN | 6th COLUMN | 7th COLUMN | 8th COLUMN | 9th COLUMN | 10th COLUMN | 11th COLUMN | ... nth COLUMN |
|---|---|---|---|---|---|---|---|---|---|---|---|---|
| 1st ROW | R1,1 | G1,2 | R1,3 | G1,4 | R1,5 | G1,6 | R1,7 | G1,8 | R1,9 | G1,10 | R1,11 | |
| 2nd ROW | | | | | | | | | | | | |
| 3rd ROW | R3,1 | G3,2 | R3,3 | G3,4 | R3,5 | G3,6 | R3,7 | G3,8 | R3,9 | G3,10 | R3,11 | |
| 4th ROW | G4,1 | G4,2 | G4,3 | B4,4 | G4,5 | G4,6 | G4,7 | B4,8 | G4,9 | B4,10 | G4,11 | |
| 5th ROW | | | | | | | | | | | | |
| 6th ROW | G6,1 | B6,2 | G6,3 | B6,4 | G6,5 | B6,6 | G6,7 | B6,8 | G6,9 | B6,10 | G6,11 | |
| ... | | | | | | | | | | | | |
| mth ROW | | | | | | | | | | | | |

| | | | | | | | | | |
|---|---|---|---|---|---|---|---|---|---|
| r1,1 | | g1,2 | | r1,3 | | | | | |
| g2,1 | | b2,2 | | g2,3 | | | | | |
| r3,1 | | r3,2 | | r3,3 | | | | | |

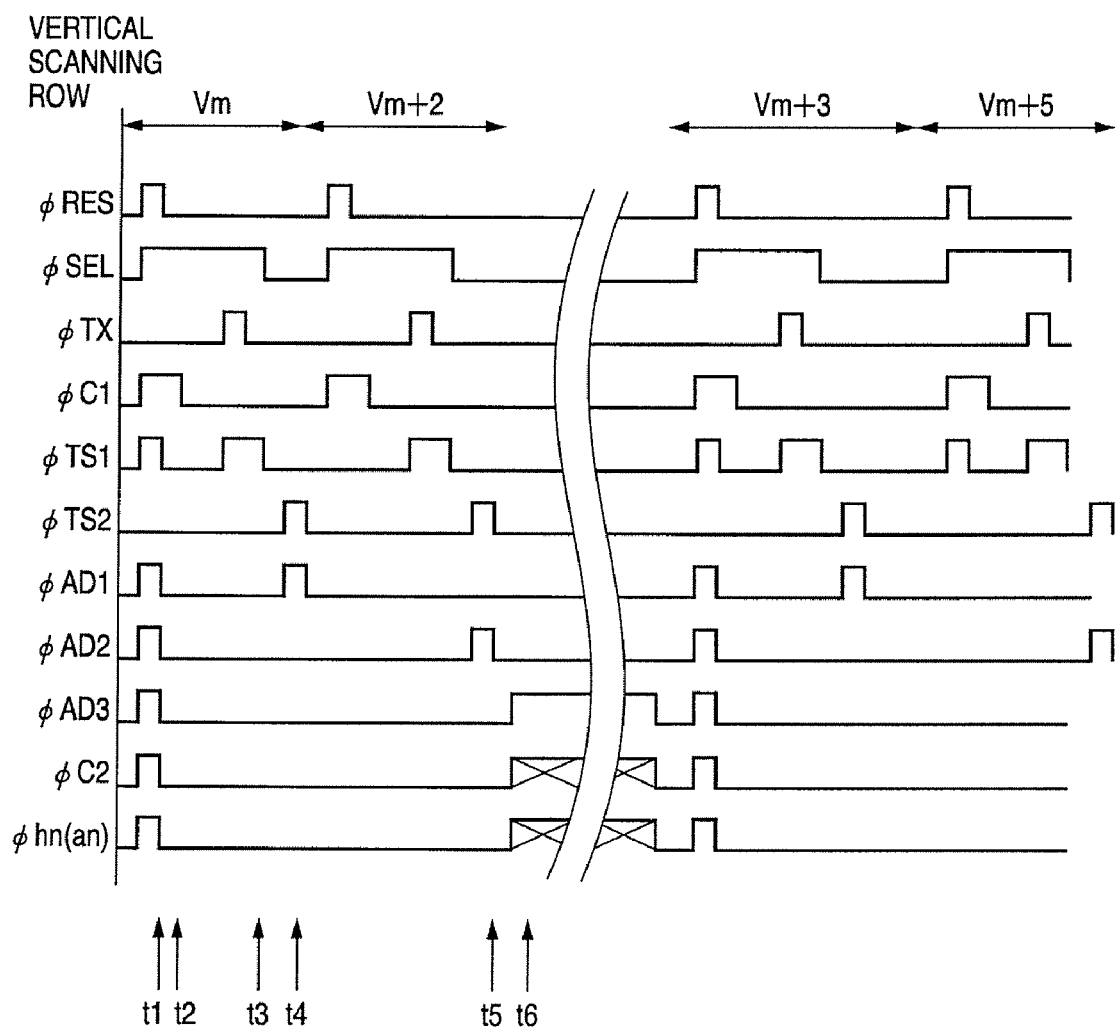

t1 PIXEL AMPLIFIER, ADDING UNIT AND MEMORY ARE RESET t2 PIXEL AMPLIFIER NOISE POTENTIAL IS CLAMPED t3 TRANSFER OF PHOTOELECTRIC CONVERSION SIGNALS ENDS t4 ADDITION AND MEMORY OF PHOTOELECTRIC CONVERSION SIGNALS OF TWO PIXELS OF M ROW t5 ADDITION AND MEMORY OF PHOTOELECTRIC CONVERSION SIGNALS OF TWO PIXELS OF M+2 ROW t6 ADDITION OF PHOTOELECTRIC CONVERSION SIGNALS OF THE FOUR PIXELS OF M ROW AND M+2 ROW t1 PIXEL AMPLIFIER, ADDING UNIT AND MEMORY ARE RESET
t2 PIXEL AMPLIFIER NOISE POTENTIAL IS CLAMPED
t3 TRANSFER OF PHOTOELECTRIC CONVERSION SIGNALS ENDS
t4 HORIZONTAL READOUT OF PHOTOELECTRIC CONVERSION SIGNALS STARTS

IMAGING APPARATUS AND IMAGING SYSTEM

BACKGROUND OF THE INVENTION

1. Field of the Invention

The present invention generally relates to an imaging apparatus and an imaging system. In particular, the present invention relates to capturing an object image.

2. Description of the Related Art

In recent years, image sensors in which the number of pixels ranges from several million to ten million or more has been employed for digital still cameras whose primary usage is still image recording. These cameras are used not only to capture truly high definition still images, but also for recording of high definition still images, high-resolution moving images, or movie recording such as NTSC that are becoming important functions. Although all pixel signals are utilized in truly high definition images, for images that are high definition and below, pixel signals to be read out are thinned out or addition of pixel signals is performed to increase sensitivity.

Japanese Patent Application Laid-Open No. 9-247689 discloses an arrangement of thinning and reading out the same color by adding output signals from each pixel in units of 4×4 pixels. Japanese Patent Application Laid-Open No. 2001-36920 discloses an arrangement of adding a plurality of pixel signals employing 4×4 pixels as one component such that the spatial color array of each color before addition is the same as that of each color after addition.

Japanese Patent Application Laid-Open No. 9-046596 discloses an arrangement comprising a common amplifier in each pixel and performing an addition of pixels with a floating unit of the common amplifier.

According to Japanese Patent Application Laid-Open No. 9-247689, although thinning and addition is performed, addition is carried out using vertical signal lines and horizontal signal lines. As a result, a large amount of kTC noise is generated by parasitic capacitances of the signal lines, and enhancing SN is difficult. Further, according to Japanese Patent Application Laid-Open No. 9-247689, a plurality of pixels arranged in a matrix are grouped in components of 4×4 pixel units, and among the color signals of pixels arranged inside these components, four signals of the same color are added.

According to the arrangement disclosed in Japanese Patent Application Laid-Open No. 9-247689, since the optical sampling pitches of the pixels to be added, that is, the spatial centroids, are not substantially the same pitch in the horizontal direction and vertical direction, an extremely large moiré is created and the image quality deteriorates significantly.

According to an arrangement disclosed in Japanese Patent Application Laid-Open No. 2001-36920, although the number of pixel signals added within a single component is increased to enhance sensitivity, pixel rows are not thinned out and it is difficult to achieve high speed driving. In a pixel amplifier-type area sensor, driving is performed in which the pixel amplifier is reset in units of each pixel row, noise is read out, photoelectric conversion signals are transferred, and the photoelectric conversion signals are read out. This driving requires several μ seconds of time, and speeding up is thus not possible in sensors with a large number of pixel rows.

According to an arrangement disclosed in Japanese Patent Application Laid-Open No. 9-046596, a signal addition is performed with a floating unit and thus sensitivity is enhanced. However, similarly to Japanese Patent Application Laid-Open No. 2001-36920, the signals of all pixels are transferred to a floating unit and are also read from a pixel amplifier, and thus time is required for this driving and the operation cannot be carried out at the driving frequency of moving images.

As described above, with the prior art, even when thinning and pixel addition is performed, moiré is created since the spatial centroids of the pixels to be added are not substantially the same pitch. Further, there is a problem that even when addition of pixel signals is performed with a common pixel amplifier, time is required for pixel driving and a driving frequency of moving images cannot be obtained.

SUMMARY OF THE INVENTION

The present invention has been made in consideration of the above problems, and has as its object to provide an imaging apparatus and an imaging system which reduce the formation of moiré fringes.

A first aspect of the present invention is associated with an imaging apparatus, and is characterized by comprising a pixel unit having a plurality of components, each having a plurality of pixels arranged in row and column directions. The plurality of pixels in each component output color signals having a plurality of colors. The apparatus also comprises an adding unit configured to perform an addition of color signals of the same color in each component, the color signals being outputted from the plurality of pixels. The adding unit performs the addition without adding a color signal outputted from a part of the plurality of pixels in each component such that spatial centroids of the added color signals having a plurality of colors are located at substantially the same pitch at least in one of the row and column directions.

A second aspect of the present invention is associated with an imaging system, and is characterized by comprising the above imaging apparatus, an optical system configured to converge light to form an image on the imaging apparatus, a recording system configured to record an output signal from the imaging apparatus, and a system control circuit configured to control the entire system.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating an example of an array of respective colors before adding pixel signals;

FIGS. 3A and 3B are views illustrating an addition method according to the preferred first embodiment of the present invention;

FIGS. 4A and 4B are views illustrating an addition method according to the preferred second embodiment of the present invention;

FIGS. 5A and 5B are views illustrating an overlapping pixel addition method according to a preferred third embodiment of the present invention;

FIG. 10 is a timing chart for addition of pixel signals of FIG. 3A;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 2:
FIG. 2 is a diagram illustrating the color array and the addition signals after adding the pixel signals.

FIG. 1 is a diagram illustrating an example of an array of respective colors before adding pixel signals. Reference numeral 101 corresponds to one pixel. In a pixel unit 100, a plurality of components that include multiple pixels are arrayed in a row direction and a column direction. FIG. 2 is a diagram illustrating the color array after adding pixel signals. Reference numeral 201 corresponds to one pixel after addition.

For the color array example shown in FIG. 1, it is assumed that color filters G (Green), R (Red), and B (Blue) are configured on each photodiode of an imaging apparatus. In this example, G is arrayed in a checkerboard pattern, and R and B are arrayed in every other line, in other words, in a 2×2 matrix, i.e., 4 pixels of R, G, G, and B are disposed two-dimensionally as one unit of a pixel color array.

In a pixel signal addition and readout imaging mode of this embodiment, as shown in FIG. 2, in order to obtain the same color array as FIG. 1, pixel signals are added within the imaging apparatus, the result is stored in a memory, and the result is then read out from the imaging apparatus. Thus, since the pixel array is the same before and after addition of pixel signals, it is possible to perform common image processing.

FIGS. 3A to 5B are views that illustrate a thinning driving operation according to a preferred first embodiment of this invention. In FIGS. 3A to 5B, a plurality of components having pixels in odd rows and odd columns are arrayed. These figures illustrate an example of pixel addition that adds color signals of the same color within each component. In FIGS. 3A and 3B, reference numeral 301 corresponds to a single component. In FIGS. 4A and 4B, reference numeral 401 corresponds to a single component. FIGS. 3A and 3B are views illustrating a case that takes nine pixels consisting of three rows and three columns as a single component 301, in which four pixels of the same color within that component are added. FIG. 3A is a view showing pixels to be added. In FIG. 3A, sensitivity can be enhanced by adding four pixel signals, and the operating frequency can be increased by performing a thinning driving operation for the pixel rows and pixel columns in the middle (i.e. not using them as pixel signals). In this example, the vertical driving frequency and the horizontal driving frequency can be increased to approximately ⅔ and their driving period can be reduced to approximately ⅔, respectively. FIG. 3B illustrates an operational expression of the addition signals shown in FIG. 3A. In this connection, to simplify the diagrammatic representation, the notation of parentheses showing the coordinates is omitted in each drawing. A pixel r(1,1) shown in FIG. 3B is a pixel obtained by adding the pixel signals of pixels R(1,1), R(1,3), R(3,1) and R(3,3) shown in FIG. 3A. Likewise, a pixel g(1,2) shown in FIG. 3B is obtained by adding the pixel signals of pixels G(1,4), G(1,6), G(3,4) and G(3,6) shown in FIG. 3A. Further, a pixel g(2,1) shown in FIG. 3B is a pixel obtained by adding the pixel signals of pixels G(4,1), G(4,3), G(6,1) and G(6,3) shown in FIG. 3A. Also, a pixel b(2,2) shown in FIG. 3B is obtained by adding the pixel signals of pixels B(4,4), B(4,6), B(6,4) and B(6,6) shown in FIG. 3A.

The spatial centroids of pixels to be added within the components are determined as follows. Herein, the term "spatial centroids of pixels to be added" refers to the geometric centroid of each pixel that is an object of addition. Accordingly, for example, the spatial centroid of pixels R(1,1), R(1,3), R(3,1) and R(3,3) shown in FIG. 3A is (N, n)=(2, 2). Likewise, the spatial centroid of pixels G(1,4), G(1,6), G(3,4) and G(3,6) is (N, n)=(2, 5). Also, the spatial centroid of pixels G(4,1), G(4,3), G(6,1) and G(6,3) is (N, n)=(5, 2). Further, the spatial centroid of pixels B(4,4), B(4,6), B(6,4), and B(6,6) is (N, n)=(5, 5). Thus, the array pitch of the spatial centroid of each pixel to be added is substantially the same pitch for the three pixels in the row direction and column direction. According to this embodiment, although the pitch in both the row direction and column direction is made substantially the same pitch, a configuration may be adopted in which the pitch is substantially the same in only either one of the row direction and column direction.

According to this embodiment, although a plurality of pixels that were arrayed in threes in the row direction and column direction, respectively, was taken as a single component, the present invention is not limited thereto, and a configuration may also be adopted that takes as one component a plurality of pixels that are arrayed in quantities of 2N+1 or 2N (N is a natural number of 1 or more) in the row direction and the column direction, respectively. Further, all pixels of the same color that are arrayed within a component need not necessarily be added. For example, in FIG. 3A, although the 3L−1 row and the 3M−1 column were subjected to thinning, only either one of the 3L−1 row and the 3M−1 column may be thinned (L and M are integers of 1 or more).

Thus, when the number of pixels to be added is increased, although the sensitivity increases, the driving frequency decreases. Accordingly, it is desirable to set the number of pixels for which a thinning driving operation can be performed within a range in which the required driving frequency can be obtained.

Further, if the spatial centroids of pixels to be added are arrayed at substantially the same pitch, the spatial centroids of pixels to be added need not necessarily be located in the center of the pixels after addition. For example, in FIG. 3A, although the 3L−1 row and the 3N−1 column were subjected to thinning, a configuration may be adopted in which the 3L row and the 3N column are thinned or the like (L and N are integers of 1 or more).

However, when the spatial centroids of pixels to be added are not located in the center of the pixels after addition, the image quality can deteriorate in comparison with a case where the spatial centroids are located in the center. Accordingly, it is desirable that the spatial centroids of pixels to be added are located in the center of the pixels after addition, although the present invention is not limited thereto.

As described above, according to this embodiment, by arranging the spatial centroid of each pixel to be added at substantially the same pitch when performing a thinning driving operation, the moiré fringes can be suppressed.

Second Embodiment

FIGS. 4A and 4B are views illustrating a thinning driving operation according to a preferred second embodiment of this invention.

FIGS. 4A and 4B are views illustrating an example according to this embodiment in which 25 pixels in five rows by five columns are taken as a single component 401, and nine pixels of the same color within the same component are added. As shown in FIG. 4B, pixels after addition r(1,1), g(1, 2), g(2,1) and b(2,2) are added based on the respective equations shown in FIG. 4B.

By adding nine pixel signals within a component in this manner, the number of pixels to be added increases in comparison to the first embodiment, and the sensitivity is enhanced. Further, since the middle pixel rows and pixel columns are subjected to a thinning driving operation, the vertical and horizontal driving frequency can be increased to approximately 5/3 and their driving period can be decreased to approximately 3/5, respectively.

In this connection, in this embodiment also, if the spatial centroids of pixels to be added are arrayed at substantially the same pitch, all pixels of the same color that are arrayed within a component need not necessarily be added.

Further, if the spatial centroids of pixels to be added are arrayed at substantially the same pitch, the spatial centroids of the pixels to be added need not necessarily be located in the center of the pixels after addition.

Third Embodiment

FIGS. 5A and 5B are views that illustrate a thinning driving operation according to a preferred third embodiment of the present invention. According to this embodiment, three rows by five columns are taken as a single component, and driving is performed to thin out the middle row within the component. FIG. 5B is a view showing an example of addition in this embodiment. In FIG. 5B, reference numerals 501*r* and 501*g* correspond to one component, respectively. According to this embodiment, addition is performed by overlapping each color in the horizontal direction.

For example, the pixel r1,1 shown in FIG. 5B is obtained by adding the pixel signals of pixels R(1,1), R(1,3), R(1,5), R(3,1), R(3,3) and R(3,5) within the component 501*r*. Likewise, the pixel g(1,2) shown in FIG. 5B is obtained by adding the pixel signals of pixels G(1,4), G(1,6), G(1,8), G(3,4), G(3,6) and G(3,8) within the component 501*g*. The pixels r(1, 3), g(2,1), g(2,1), b(2,2), g(2, 3) and the like are determined in a similar manner. In this case, taking the components 501*r* and components 501*g* as an example, the two components spatially overlap in a manner (row, column)=(1, 4), (1, 5), (2, 4), (2, 5), (3, 4), (3, 5).

By allowing a part of the components to overlap spatially and adding in this way, the sensitivity can be enhanced even further. Also, since the centroids in the spatial sampling between color signals in the horizontal direction that were added are at substantially the same pitch, moiré fringes can be reduced. Although the present embodiment has taken three rows by five columns as a single component, the invention is not limited thereto, and a configuration may be adopted in which a plurality of pixels are arrayed in quantities of 2N+1 or 2N (N is a natural number of 1 or more) in the row direction and the column direction, respectively. Also, although the middle row within each component was the object of a thinning driving operation, another row within each component (i.e. an odd row inside the component) may be the object of a thinning driving operation either instead of or in addition to the middle row.

To increase the driving frequency further, the middle column may also be thinned, and another column (i.e., an odd column inside the component) may be subjected to a thinning driving operation either instead of or in addition to the middle row.

In this embodiment also, if spatial centroids of pixels to be added are arrayed at substantially the same pitch, it is not always necessary to add all pixels of the same color that are arrayed within a component.

Further, the spatial centroids of pixels to be added need not necessarily be located in the center of the pixels after addition.

[Example of Internal Structure of Imaging Apparatus]

Figure 6:
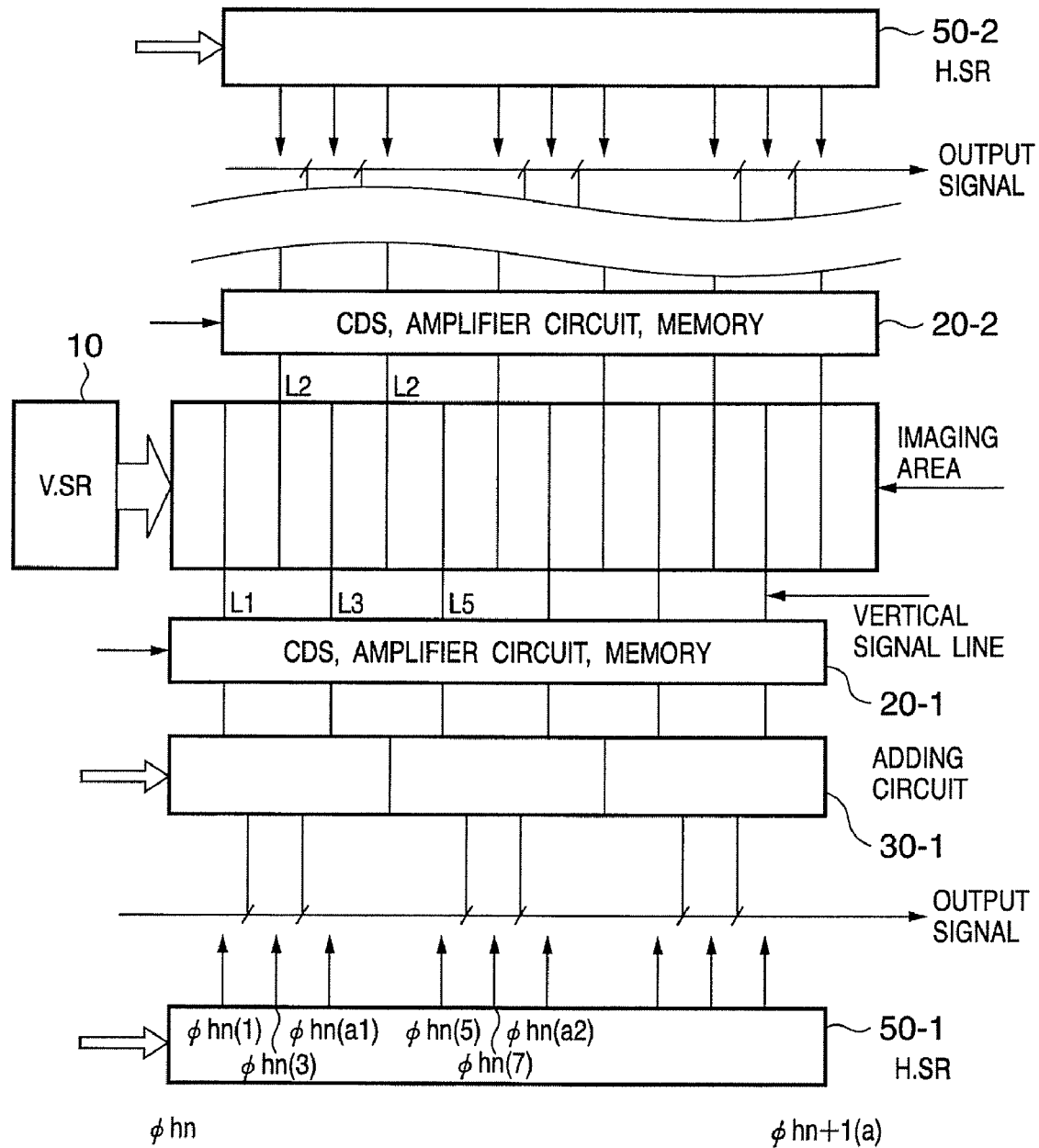
FIG. 6 is a circuit block diagram of an imaging apparatus according to a preferred embodiment of the present invention.
Figure 12:
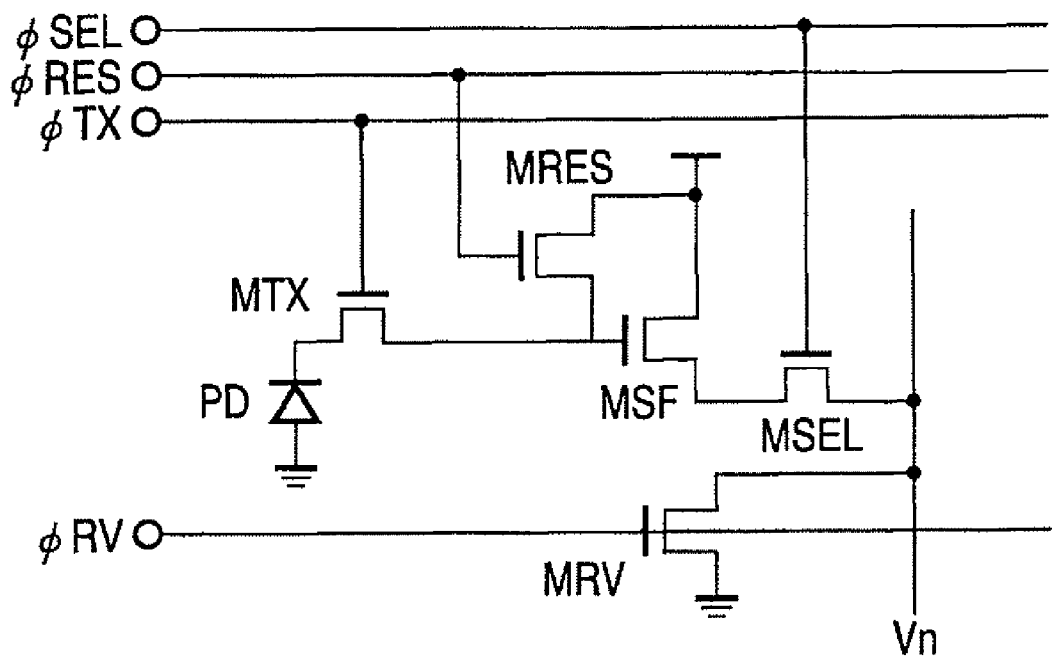
FIG. 12 is a circuit diagram of a unit pixel of the pixel unit.
Figure 13:
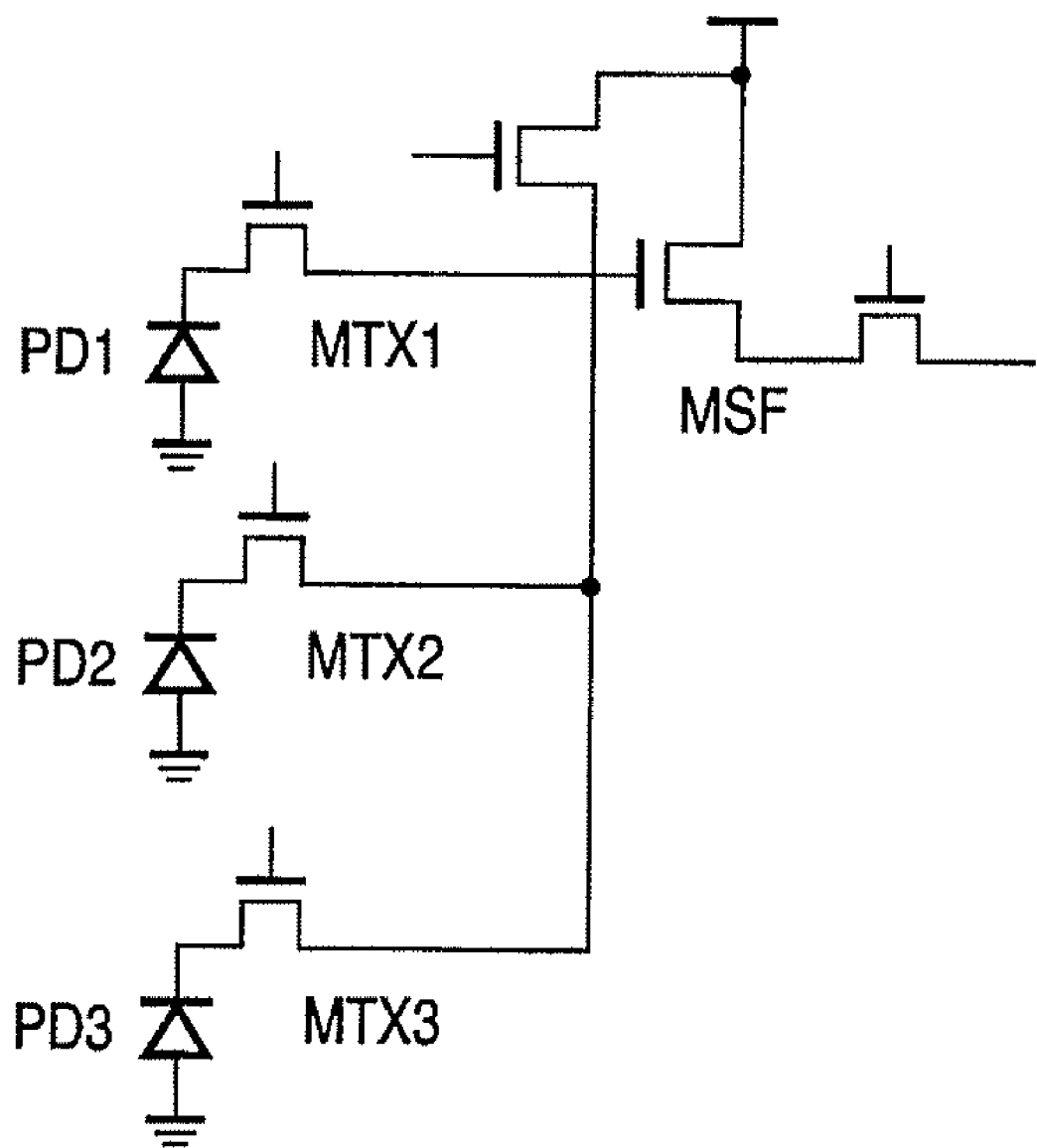
FIG. 13 is a circuit diagram of a shared amplifier pixel.

Next, an example of the internal structure of an imaging apparatus will be described. FIG. 6 is a block diagram of an imaging apparatus according to a preferred embodiment of this invention. In FIG. 6, pixel units that include a pixel amplifier and a photodiode for photoelectric conversion as shown in FIG. 12 and FIG. 13 to be described later are arrayed in a matrix shape in the imaging area. The pixel units of this imaging area are controlled by a plurality of drive pulses that are output from a vertical scanning circuit (V.SR) 10. The odd-numbered vertical signal lines of the imaging area are connected to a circuit 20-1 that includes a CDS, an amplifier circuit and a memory, and the even-numbered vertical signal lines are connected to a circuit 20-2 that includes a CDS, an amplifier circuit and a memory. In the following description, signals R and signals G of odd-numbered columns are transferred in sequence to the upper circuit of the imaging area in FIG. 6, and signals G and signals B of even-numbered columns are transferred in sequence to the lower circuit thereof. However, since the upper and lower circuits have the same configuration, a description is only provided for the lower circuit block, and a description of the upper circuit block is omitted.

With respect to a signal from the pixel unit, the noise thereof is removed by the CDS and the amplifier circuit, and only the signal component is amplified and then temporarily stored in the memory. According to this embodiment, although not illustrated in the drawings, a circuit for correcting an offset variation may be provided between amplifier circuits. When the present imaging apparatus is in an all pixel readout mode, and not an addition and readout mode, signals from memory are controlled by scanning pulses ϕhn (ϕhn (1), ϕhn (2), ϕhn (3)) from a horizontal scanning circuit (H.SR), and readout to an output signal line. When in an addition and readout mode, signals from memory are guided to an adding circuit 30-1. In the adding circuit 30-1, signals of the same color from the memory are added. Signals that were added in the adding circuit 30-1 are controlled by scanning pulses ϕthn (a1, a2) from a horizontal scanning circuit (H.SR), and readout to an output signal line.

Figure 7:
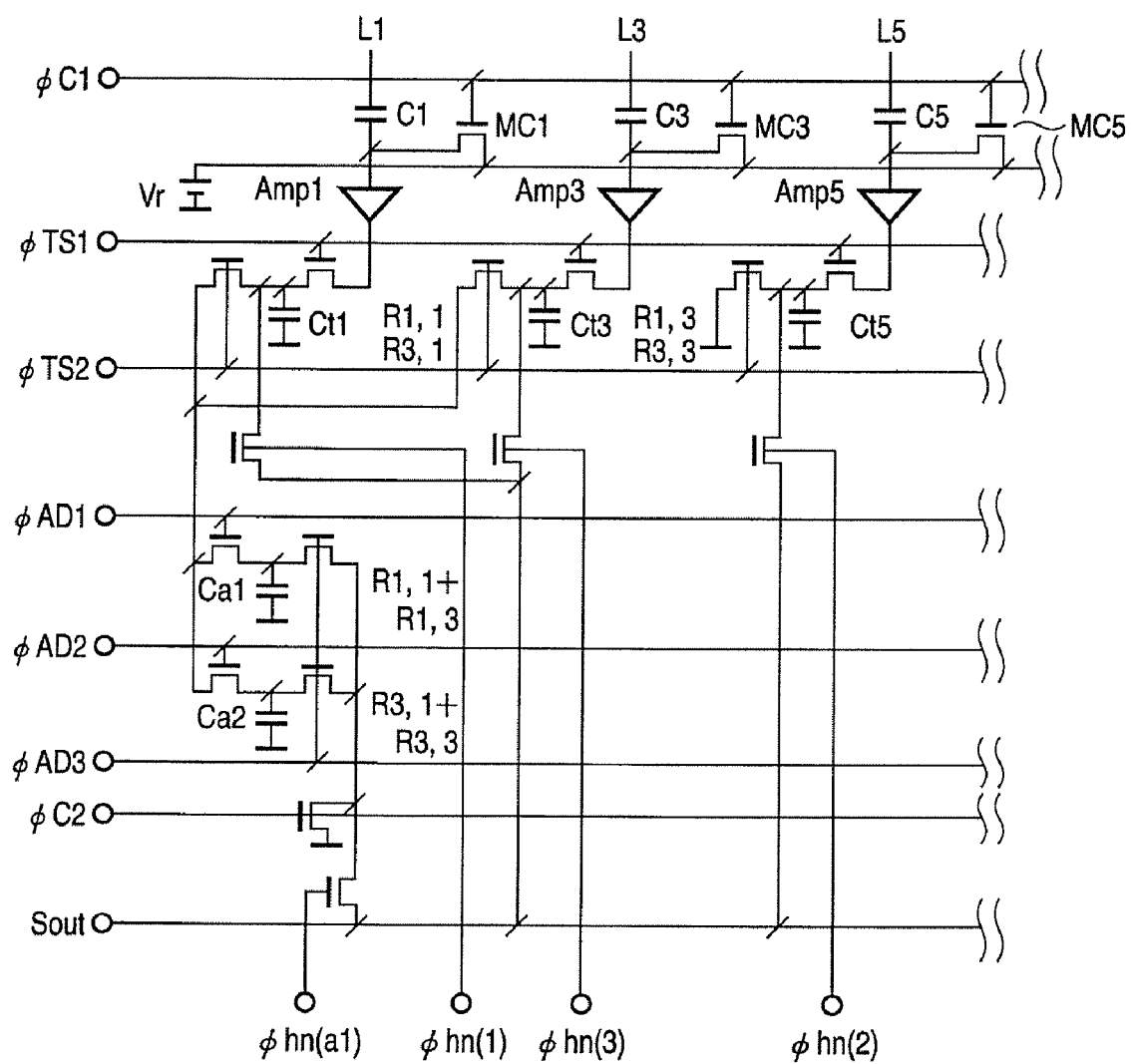
FIG. 7 is a circuit diagram of one part of a readout signal processing circuit for reading out pixel signals from the imaging area according to a preferred first embodiment of the present invention.
Figure 11:
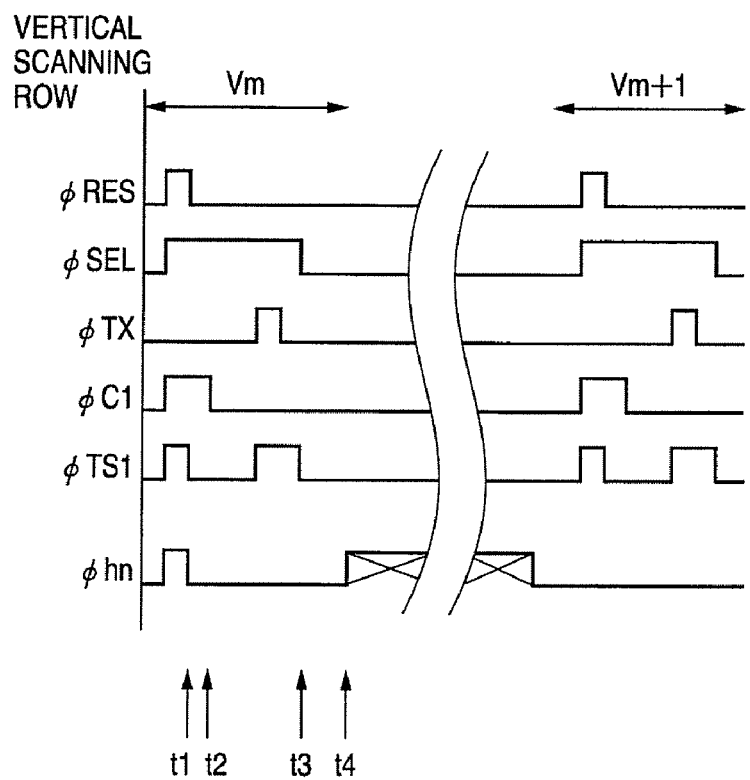
FIG. 11 is a timing chart for readout of all pixel signals of FIG. 7.

FIG. 12 is a circuit diagram of a unit pixel of the pixel unit, FIG. 7 is a circuit diagram of one part of a readout signal processing circuit for pixel signals from the imaging area, and FIG. 11 is a timing chart for the addition of pixel signals. Hereunder, signal addition and signal readout from the pixel unit will be described using FIG. 7, FIG. 11 and FIG. 12. In this connection, FIG. 7 is a schematic circuit diagram for implementing the method of addition shown in FIGS. 3A and 3B. The pixel unit shown in FIG. 12 includes a photodiode PD, a transfer switch MTX, a pixel amplifier MSF, a reset switch MRES, and a select switch MSEL. The photodiode PD functions as a photoelectric conversion unit. Transfer of signal charge from the photodiode PD is controlled by the transfer switch MTX. The pixel amplifier MSF is connected to the transfer switch MTX. The reset switch MRES resets a residual charge of a gate unit (floating diffusion) of the pixel amplifier MSF. The select switch MSEL controls the transfer of a signal charge from the pixel amplifier MSF. A current source switch MRV of the pixel amplifier MSF is provided outside the imaging area.

Figure 14:
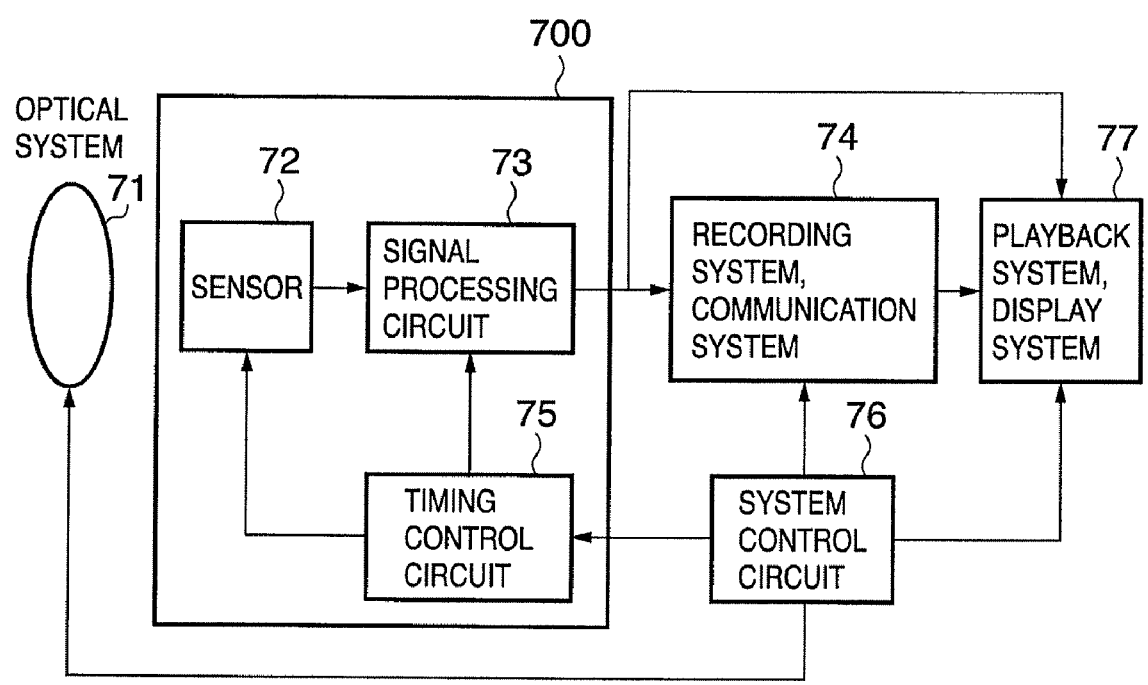
FIG. 14 is a view illustrating an imaging system using the above imaging apparatus.

Next, the readout signal processing circuit shown in FIG. 7 will be described. A CDS (Correlated Double Sampling) circuit includes clamp capacities C1, C3, and C5, clamp switches MC1, MC3, MC5, a voltage reference Vr, and amplifiers Amp1, Amp3, and Amp5. The CDS circuit removes noise of the pixel unit. The clamp capacities C1, C3 and C5 are connected to vertical signal lines L1, L3 and L5. Memory capacitors Ct1, Ct2, and Ct3 of the memory circuit temporarily store signals that were sampled according to the CDS method. A memory capacitor Ca1 adds two signals of a memory and temporarily stores the result. Similarly, a memory capacitor Ca2 temporarily stores an addition signal of different horizontal pixel rows. Addition of signals is performed by connecting the output ends of the memory capacitors Ca1 and Ca2. In FIG. 7, since the addition of signals is not performed with the vertical signal line L5, an addition memory is not provided. As described above, in FIG. 6 and FIG. 7, thinning and addition of signals was performed within an image sensor (sensor). In high speed imaging this method is advantageous. However, as a separate method, thinning of signals may be carried out in the same manner within an image sensor (sensor), while the addition of signals may be carried out inside a memory of a signal processing circuit 73 as shown in FIG. 14.

Next, a description will be provided using the timing chart of FIG. 10. First, after an arbitrary exposure period passes, a residual charge in a node of each circuit part is reset by control of respective pulses.

At a time t1, the gate unit of the pixel amplifier MSF is reset by a pulse φRES, the memory Ct is reset by pulses φC1 and φTS1, and adding unit capacitors Ca1 and Ca2 are reset by pulses φAD1, φAD2, φAD3 and φC2. At a time t2, when the pulse φC1 is OFF the pixel amplifier noise is clamped by clamp capacitors C1 to C3, and a charge of the photodiode PD is input to the clamp capacitors C1 to C3 via the pixel amplifier MSF by means of a pulse φTX.

As a result, pixel noise is subjected to CDS removal, and signals are temporarily stored in the memory via the amplifier Amp. In this case, if vertical scanning is assumed to be scanning of N rows as shown in FIGS. 3A and 3B, as a result of signals from vertical signal lines L1 and L3, signals R(1,1) and R(1,3) are temporarily stored in memory capacitors Ct1 and Ct3, respectively.

At a time t3, as a result of pulses φSEL and φTS1 being OFF, transfer of photoelectric conversion signals of N row pixels ends.

At a time t4, memory signals R(1,1) and R(1,3) are added in the adding memory capacitor Ca1 as a result of pulses φTS2 and φAD1. Subsequently, the N+1 row is subjected to skip scanning, and by performing the same scanning and operation for the N+2 row as the N row, at a time t5 the pixel signals R(3,1) and R(3,3) of the N+2 row are added in the memory capacitor Ca2. At a time t6, the signals of four pixels R(1,1), R(1,3), R(3,1) and R(3,3) are added at a pulse φAD3, to obtain an addition signal r(1,1). Although a description is omitted here, as a consequence other addition signals g(1,2), r(1,3) and g(1,4) are also formed. The same operation is repeated to form addition signals within the screen.

In the addition and readout mode, for four pixels as described above, since the sensitivity is improved twofold (light shot noise), exposure amount control is performed for the system and the amount of incident light is set to approximately ½. This means that the photoelectric conversion signal of each photodiode becomes ½. When the imaging apparatus uses a CCD, even if the amount of incident light is ½, by adding the charges of four pixels, the signal charge amount after addition is doubled. Accordingly, in this state, signal saturation becomes a problem and there is a drawback that there is a tradeoff between sensitivity and saturation characteristics.

With the CMOS sensor of this embodiment, in order to add the mean value of the signal voltage, if a drop in the signal level due to capacitor division is disregarded, the signal level also becomes approximately ½ after addition of the four pixel signals. This means that the signal saturation was strengthened twofold. However, when the signal level is low, noise of an output amplifier (omitted from FIG. 7) that connects to a horizontal output line may become a problem. Therefore, according to a preferred embodiment of this invention, when the apparatus is in the addition and readout mode, the amplifier gain of the amplifier circuit Amp after CDS is set to approximately twice that at the time of all pixel readout mode. As a result, it is possible to alleviate noise of the output amplifier and to realize lower power levels and maintenance of a high dynamic range and high speed readout by reducing the number of readout pixels and increasing sensitivity by adding the pixel signals.

Figure 8:
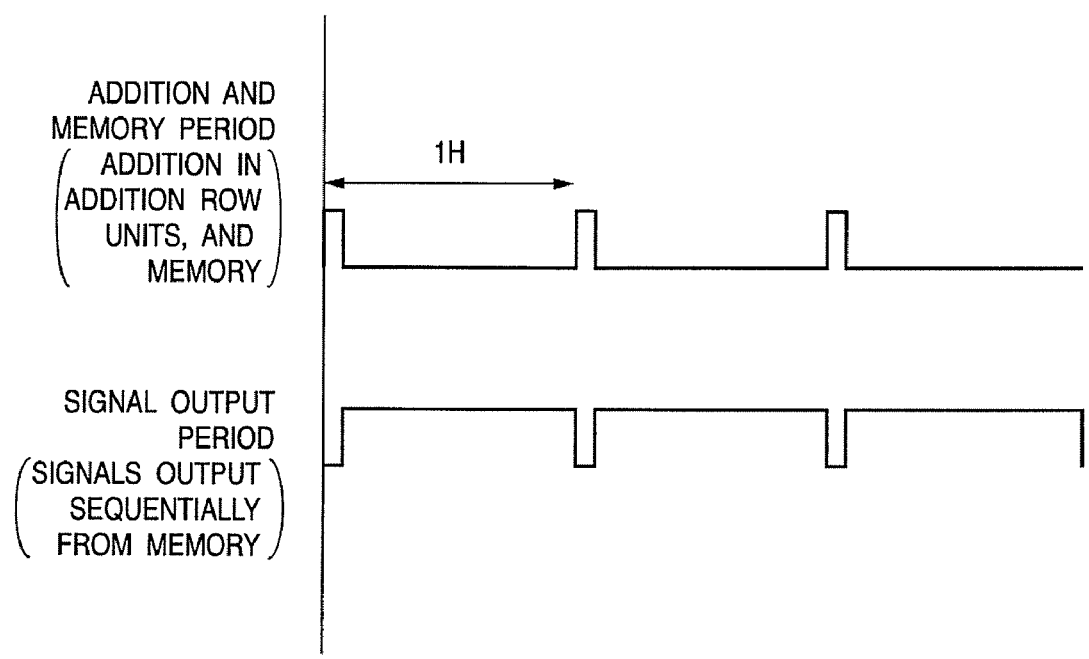
FIG. 8 is a timing chart for readout and addition of pixel signals.

FIG. 8 illustrates an embodiment of a signal readout method in the addition and readout mode. FIG. 8 shows an example of signal readout in multiple row units that are to be added. In this case, signals are readout from pixels in the row units to be added, and addition (Ca) with the signal memory (Ct) is performed. Thereafter, signals are output to the outside from two addition memories Ca within a horizontal scanning period.

Figure 9:
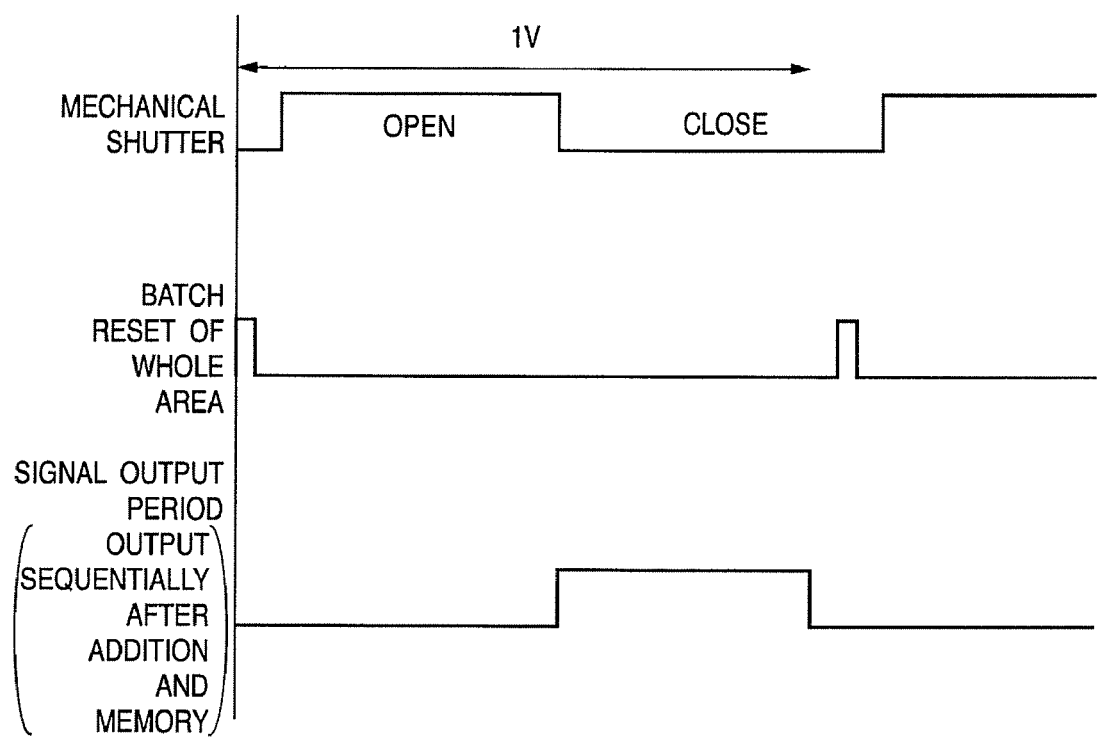
FIG. 9 is a view illustrating a case using a mechanical shutter.

FIG. 9 is a view illustrating a case that utilizes a mechanical shutter. In this case, all pixels of the imaging area are reset in one batch over the whole area, and after exposure ends with the mechanical shutter, pixel signals are output to the outside with an arbitrary addition unit from a memory after addition 2 in one horizontal scanning period.

FIG. 11 shows a timing example for readout of all pixel signals. According to this embodiment, the pixel amplifier and memory are reset at a time t1, clamping of the pixel amplifier noise potential is performed at a time t2, and CDS processing ends and signals are stored in memory Ct at a time t3. From a time t4 and thereafter, signals are readout to a horizontal signal output line.

FIG. 12 shows a configuration in which one pixel amplifier is provided for one photodiode as the pixel unit of an imaging area. FIG. 13 shows a configuration using a shared amplifier pixel as another embodiment of a pixel unit. This is an example in which a plurality of photodiodes is provided with respect to a single pixel amplifier. When a plurality of photodiodes PD1, PD2 and PD3 are disposed with respect to a single amplifier, the area of the pixel amplifier with respect to a single photodiode decreases. Consequently there is an effect that the aperture ratio of the photodiode increases. In this connection, although according to this embodiment a configuration was described in which three photodiodes are provided with respect to one pixel amplifier, the invention is not limited thereto, and an arbitrary number of photodiodes can be provided with respect to a single pixel amplifier.

FIG. 14 is a view illustrating an outline of an imaging system that uses the above described imaging apparatus. This imaging system includes an imaging apparatus 700 that consists of a sensor 72, a signal processing circuit 73 and a timing control circuit 75. As shown in the figure, light of an object that was incident through an optical system 71 forms an image on the sensor 72. Light information from pixels disposed on the sensor is converted into an electrical signal. The electrical signal is subjected to signal conversion processing according to a predetermined method by the signal processing circuit 73. The signals that underwent signal processing are communicated to or recorded by an information recording apparatus by means of a recording system and communication system 74. Playback or display of the recorded or transferred signals is performed at a playback system and display system 77. The sensor 72 and the signal processing circuit 73 are controlled by the timing control circuit 75, and the timing control circuit 75, the recording system and communication system 74 and the playback system and display system 77 are controlled by a system control circuit 76. Selection of all pixel readout mode or addition and readout mode is performed by the timing control circuit 75.

In the aforementioned all pixel readout mode and the addition and readout mode, the horizontal and vertical drive pulses are different. Accordingly, it is necessary to change the drive timing of the sensor, resolution processing of the signal processing circuit, and the number of recording pixels of the recording system for the respective readout modes. These control operations are performed in accordance with the respective readout mode at the system control circuit. Further, the sensitivity resulting from addition differs in the readout modes. In this case, aperture (not shown) control is performed at the system control circuit, and switching is also performed with a control pulse (not shown) from the timing control circuit so as to increase the gain of the amplifier circuit Amp of the sensor to obtain an appropriate signal.

According to the present imaging system, all pixel readout is carried out for high definition imaging, and for low resolution imaging a high sensitivity is produced by adding pixel signals, high speed readout is produced by thinning driving, and the sampling pitches of signals after addition are made substantially the same pitch so that a high image quality can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-321398 filed on Nov. 4, 2005, which is hereby incorporated by reference herein in its entirety.

What is claimed is:

1. An imaging apparatus comprising:
a pixel unit having a plurality of components, each having a plurality of pixels arranged in row and column directions, the plurality of pixels in each component outputting color signals having a plurality of colors; and
an adding unit including a plurality of units each configured to perform an addition of color signals of the same color in a corresponding component, the color signals of the same color in the corresponding component being outputted from the plurality of pixels,
wherein each unit of the adding unit comprises:
a plurality of first memory devices configured to respectively hold the color signals output from pixels in a selected row of the corresponding component; and
a plurality of second memory devices, the color signals held in the plurality of first memory devices being added and the added result being stored in a second memory device selected from the plurality of second memory devices, and the added results stored in the plurality of second memory devices being added to generate a signal of the corresponding component, and
wherein the adding unit performs the addition without adding a color signal outputted from a part of the plurality of pixels in each component such that spatial centroids of the added color signals having a plurality of colors are located at substantially the same pitch at least in one of the row and column directions.

2. The apparatus according to claim 1, wherein four pixels located at four corners of the plurality of pixels arranged in row and column directions in each of the components output the same color and the adding unit adds the color signals outputted from the four pixels.

3. The apparatus according to claim 1, wherein the adding unit does not perform an addition of the color signals outputted from pixels arranged at least in one of even rows and even columns of the plurality of pixels arranged in row and column directions of each of the components.

4. The apparatus according to claim 1, wherein the adding unit does not perform an addition of the color signals outputted from pixels arranged at least in one of odd rows and odd columns of the plurality of pixels arranged in row and column directions of each of the components.

5. The apparatus according to claim 1, wherein a part of at least one of the plurality of components spatially overlaps a part of another one of the plurality of components.

6. The apparatus according to claim 1, wherein each of the plurality of components includes 2N+1 pixels in the row and column directions respectively, where N is an integer greater than or equal to 1.

7. The apparatus according to claim 1, wherein each of the plurality of components includes 2N pixels in the row and column directions respectively, where N is an integer greater than or equal to 1.

8. An imaging system comprising:
an imaging apparatus defined in claim 1;
an optical system configured to converge light to form an image on the imaging apparatus;
a recording system configured to record an output signal from the imaging apparatus; and
a system control circuit configured to control the entire imaging system.

* * * * *